United States Patent
Ortega (10) Patent No.: US 10,959,400 B2
(45) Date of Patent: Mar. 30, 2021

(54) TEMPORARY PET KENNEL

(71) Applicant: Bairon DeJesus Ortega, Hialeah, FL (US)

(72) Inventor: Bairon DeJesus Ortega, Hialeah, FL (US)

( * ) Notice: Subject to any disclaimer, the term of this patent is extended or adjusted under 35 U.S.C. 154(b) by 203 days.

(21) Appl. No.: 15/848,976

(22) Filed: Dec. 20, 2017

(65) Prior Publication Data

US 2018/0168124 A1 Jun. 21, 2018

Related U.S. Application Data (63) Continuation-in-part of application No. 29/592,094, filed on Jan. 26, 2017, now Pat. No. Des. 830,004.

(60) Provisional application No. 62/437,560, filed on Dec. 21, 2016.

(51) Int. Cl.
| | |
|---|---|
| *A01K 1/03* | (2006.01) |
| *A01K 1/035* | (2006.01) |
| *A01K 1/02* | (2006.01) |
| *A01K 1/00* | (2006.01) |

(52) U.S. Cl.
CPC ............ *A01K 1/034* (2013.01); *A01K 1/0236* (2013.01); *A01K 1/0353* (2013.01)

(58) Field of Classification Search
CPC .... A01K 1/034; A01K 1/0236; A01K 1/0353; A01K 1/0035; A01K 1/033; A01K 1/0245; A01K 1/035
USPC .......................................... 220/632; 119/496
See application file for complete search history.

(56) References Cited

U.S. PATENT DOCUMENTS

| | | | | |
|---|---|---|---|---|
| 3,502,237 | A * | 3/1970 | Verhein | B65D 19/12 220/4.28 |
| 5,136,477 | A * | 8/1992 | Lemmey | F21L 4/04 362/109 |
| 5,220,884 | A * | 6/1993 | Townsend | A01K 1/0236 119/28.5 |
| D534,692 | S * | 1/2007 | Northrop | D30/118 |
| 8,584,618 | B1 * | 11/2013 | Batson | A01K 1/0245 119/496 |
| 9,095,120 | B1 * | 8/2015 | Skaggs | A01K 1/0245 |
| 2011/0005466 | A1 * | 1/2011 | Furth | A01K 1/0236 119/496 |

(Continued)

FOREIGN PATENT DOCUMENTS

WO WO-2007094794 A1 * 8/2007 .......... A01K 1/0245

*Primary Examiner* — Magdalena Topolski
*Assistant Examiner* — Kevin M Dennis (57) ABSTRACT

The temporary pet kennel is an apparatus that serves as a temporary housing and a bed for a pet. The temporary pet kennel includes an elongated enclosure, a cushion, a plurality of fasteners, and at least one ventilation hole. The elongated enclosure further includes a first portion and a second portion. The first portion and the second portion, together, enclose the pet. The cushion is contained within the second portion which supports and comforts the pet which rests on the cushion. The plurality of fasteners secures the first portion to the second portion so that the pet remains within the elongated enclosure until the user purposefully disengages the plurality of fasteners. The at least one ventilation hole allows the pet within the elongated enclosure to properly breathe. The apparatus further includes a support plate and a stand which provide storage within the elongated enclosure.

9 Claims, 9 Drawing Sheets

(56) References Cited

U.S. PATENT DOCUMENTS

2014/0230746 A1\* 8/2014 Chapman ............. A01K 1/0254
119/453
2015/0101543 A1\* 4/2015 Baxter ................. A01K 5/0142
119/498

\* cited by examiner

TEMPORARY PET KENNEL

The current application claims priority to U.S. provisional application Ser. No. 62/437,560 filed on Dec. 21, 2016.

FIELD OF THE INVENTION

The present invention generally relates to pet housings. More specifically, the present invention is a temporary pet kennel.

BACKGROUND OF THE INVENTION

Pets easily become integral members of families. Whether the pet is a cat or dog or hamster, pets bring joy and comfort to families and individuals everywhere. Giving a pet to someone special or a child is a commemorative moment in that person's life that is forever cherished. Consequently, the emotional investment while taking care of a pet can lead to great difficulty once the pet passes. Remembering a pet even once the pet has passed both helps with the healing process and allows the memory of the pet to live on.

It is therefore an objective of the present invention to provide a temporary pet kennel that can create a memorable meeting with a pet. The pet may be temporarily contained before being presented as a gift. The present invention further imprints the memory of a pet onto his or her owners as the present invention is convertible into a bed. The pet uses the present invention as a bed every day. The user then associates the present invention with the pet even though the pet may not be using the present invention. The present invention further memorializes the pet as the present invention is able to contain an urn once the pet has passed.

DETAIL DESCRIPTIONS OF THE INVENTION

All illustrations of the drawings are for the purpose of describing selected versions of the present invention and are not intended to limit the scope of the present invention.

The present invention is a temporary pet kennel that effectively contains a pet for a brief amount of time while aesthetically enhancing the surrounding environment. The present invention may also serve as a bed for the pet throughout the life of the pet. In order to provide both temporary housing and permanent bedding for the pet, the present invention comprises an elongated enclosure 1, a cushion 9, a plurality of fasteners 10, and at least one ventilation hole 15, as seen in FIG. 1, FIG. 5, FIG. 6, and FIG. 7. The elongated closure upholds the pet above the ground as well as contains the pet. The elongated closure may also house an urn of the pet. More specifically, the elongated enclosure 1 comprises a first portion 2 and a second portion 6. The first portion 2 surrounds the pet as the pet rests within the second portion 6. A first opening 3 is delineated by a first rim 4 of the first portion 2. Similarly, a second opening 7 is delineated by a second rim 8 of the second portion 6. The first opening 3 and the second opening 7 allows the pet to be surrounded by the first portion 2 and the second portion 6, respectively. The first rim 4 and the second rim 8 allow the first portion 2 and the second portion 6 to be aligned with each other, respectively. In the preferred embodiment of the present invention, the elongated enclosure 1 is configured into a teardrop-shaped profile. The teardrop-shaped profile structurally supports the pet within the elongated enclosure 1. More specifically, the first portion 2 tapers from the first rim 4 to an apex 5 of the first portion 2 so that the pet does not easily tip over within the elongated enclosure 1.

The cushion 9 supports and comforts the pet resting within the second portion 6. The cushion 9 is seen in the elongated enclosure 1 in FIG. 4. The pet rests within the second portion 6 while being temporarily being contained. The pet also rests within the second portion 6 while using the second portion 6 and the cushion 9 together as a bed. The plurality of fasteners 10 secures the first portion 2 to the second portion 6 so that the pet may be temporarily contained by the elongated enclosure 1. In order for the pet to breathe properly within the first portion 2 and the second portion 6, the at least one ventilation hole 15 aerates an interior environment defined by the first portion 2 and the second portion 6. The at least one ventilation hole 15 may comprise a variety of cross-sections that contribute to the overall aesthetic of the present invention.

Figure 6:
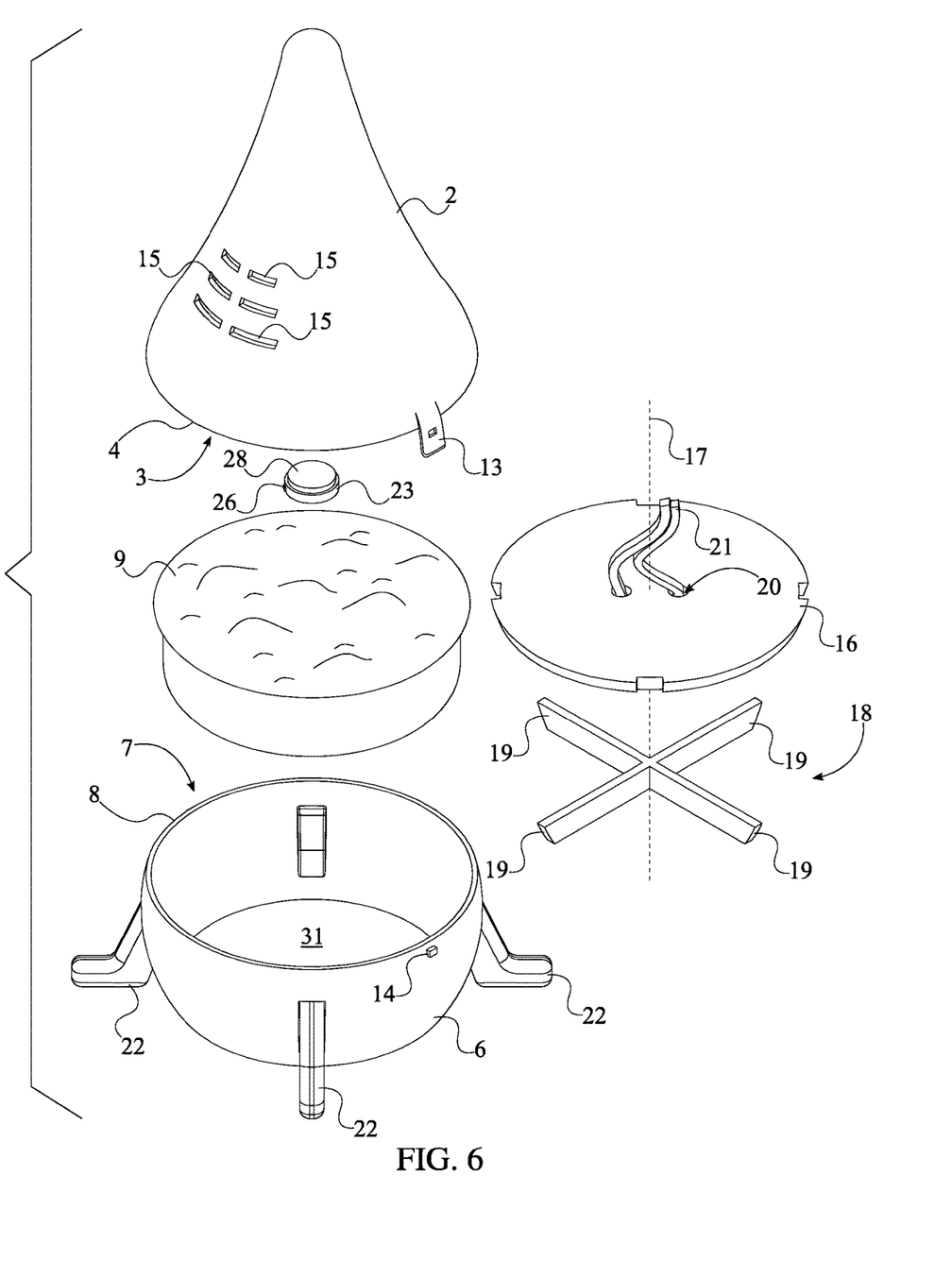
FIG. 6 is a top perspective exploded view of the present invention.
Figure 7:
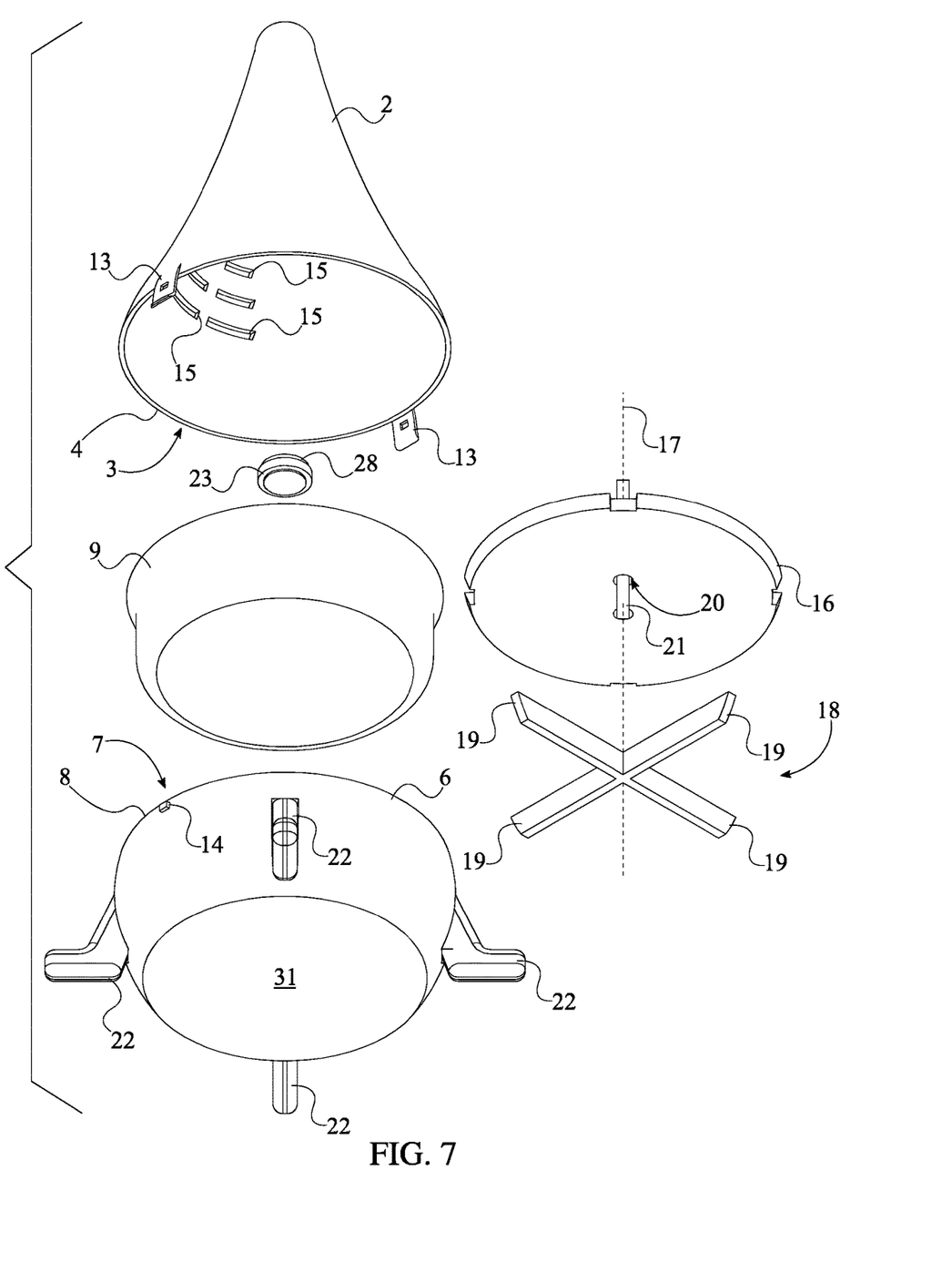
FIG. 7 is a bottom perspective exploded view of the present invention.
Figure 8:
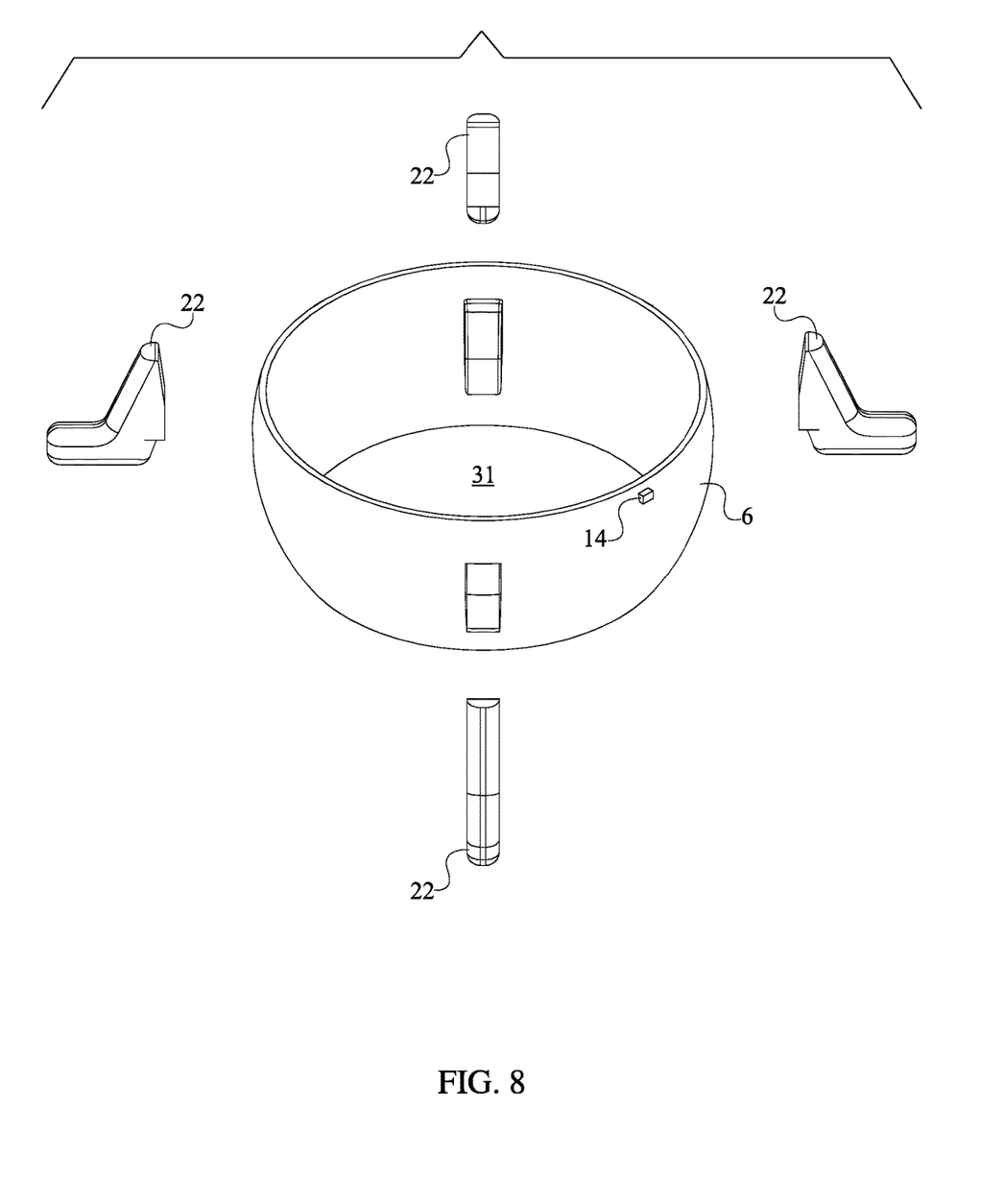
FIG. 8 is an exploded view of the second portion of the elongated enclosure with the plurality of legs of the present invention.

The overall configuration of the aforementioned components effectively houses a pet as well as provide a bed for the pet. In order to house the pet, the first opening 3 is positioned adjacent the second opening 7, and the first rim 4 and the second rim 8 are coextensively aligned to each other, as seen in FIG. 6 and FIG. 7. The first portion 2 is connected to the second portion 6 with the plurality of fasteners 10. This arrangement prevents the pet within the interior environment from escaping unless a user disengages the plurality of fasteners 10 and separates the first portion 2 from the second portion 6. The cushion 9 traverses into the second opening 7 such that the pet resting within the second portion 6 does not come into contact with the second portion 6, thereby comfortably resting within the interior environment. More specifically, the second rim 8 is perimetrically positioned around the cushion 9 so that the second portion 6 may connect with the first portion 2 while containing the pet and the cushion 9. In the preferred embodiment of the present invention, the at least one ventilation hole 15 traverses into the first portion 2 so that the pet within the elongated enclosure 1 may directly receive fresh air from a surrounding environment of the elongated enclosure 1.

The present invention further serves as a portable storage container for a pet contained within the present invention. The preferred embodiment of the present invention comprises a supporting plate 16 and a stand 18, illustrated in FIG. 4, FIG. 6, and FIG. 7. The supporting plate 16 supports the cushion 9 and the pet, and the stand 18 uplifts the cushion 9 and the pet above a base 31 of the second portion 6. The supporting plate 16 and the stand 18 are positioned within the second portion 6 so that the second portion 6 encloses items within the present invention. The stand 18 is pressed against the base 31 of the second portion 6, and the supporting plate 16 is pressed against the stand 18, opposite the base 31 of the second portion 6. This arrangement allows items of the pet to be contained between the supporting plate 16 and the second portion 6. Items of the pet may include but are not limited to toys, dog food, treats, and so on. The cushion 9 is pressed against the supporting plate 16 so that the pet does not come into the items of the pet beneath the support plate.

Figure 4:
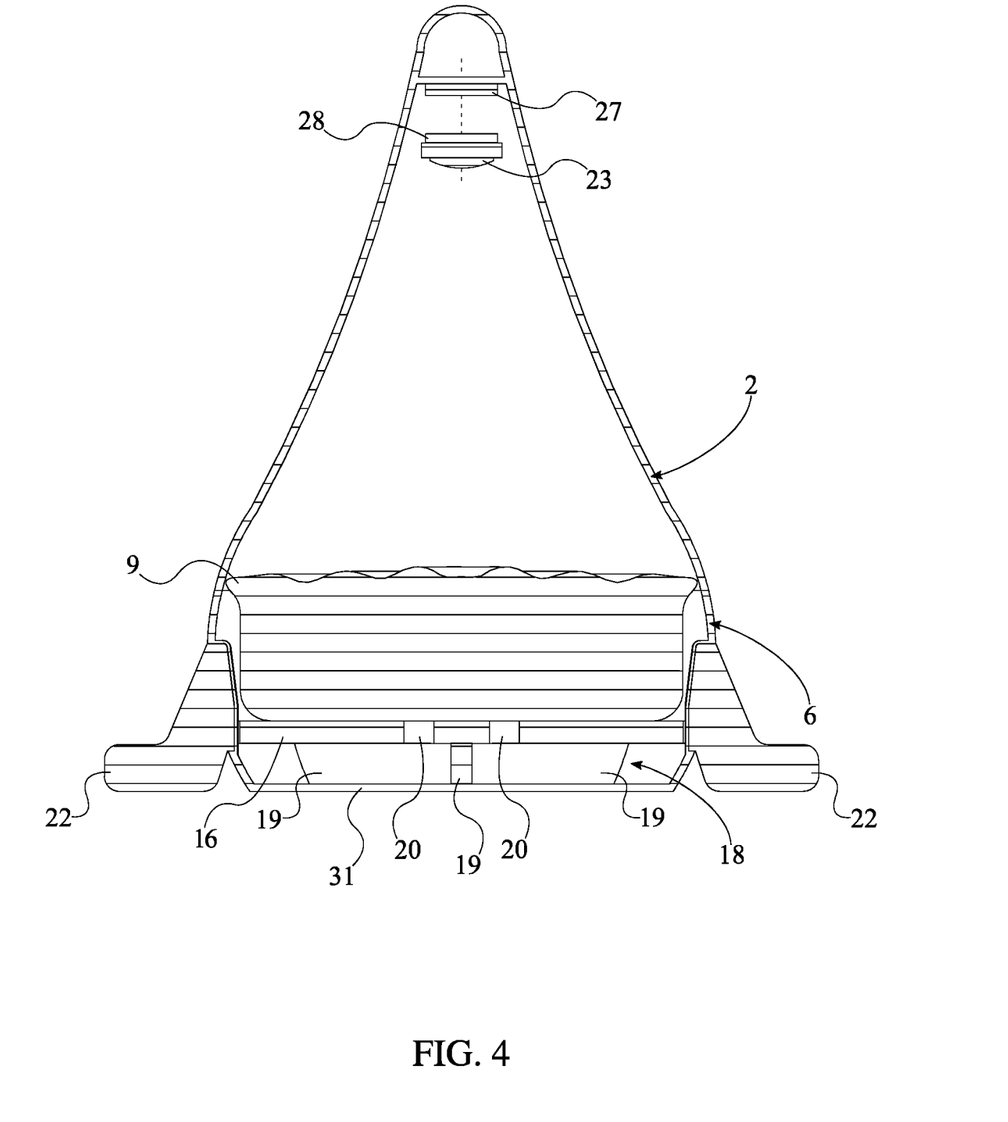
FIG. 4 is a cross-section of FIG. 3 along line 4-4 of the present invention.
Figure 5:
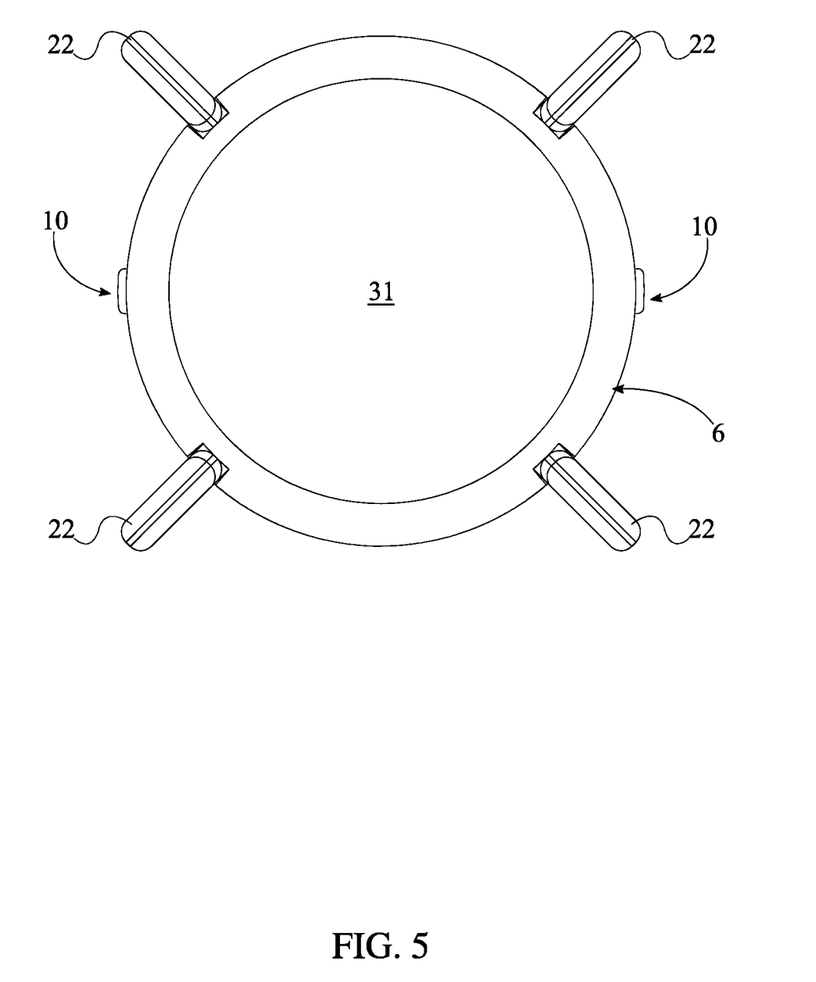
FIG. 5 is a bottom side view of the present invention.

The stand 18 further comprises a plurality of elongated dividers 19, also seen in FIG. 4, FIG. 6, and FIG. 7. The plurality of elongated dividers 19 upholds the supporting plate 16 above the base 31 of the second portion 6 while defining a plurality of compartments. The plurality of compartments prevents different types of items from mixing with one another. The plurality of elongated dividers 19 is preferably radially distributed around a central axis 17 of the support plate. This arrangement accommodates the overall structure of the second portion 6.

In order to easily remove the support plate from within the second portion 6, the present invention preferably comprises a pair of holes 20, seen in FIG. 4, FIG. 6, and FIG. 7. The pair of holes 20 allows a user to insert a couple of fingers into each hole of the pair of holes 20, respectively, and lift the supporting plate 16. The pair of holes 20 traverses through the supporting plate 16 and is oriented normal to the supporting plate 16. An alternate embodiment of the present invention comprises a strap 21. The strap 21 further facilitates the removal of the supporting plate 16 from within the second portion 6. The strap 21 is connected onto the supporting plate 16 and is positioned opposite to the stand 18. This arrangement allows the user to lift the supporting plate 16 from the stand 18 after the removal of the cushion 9 from the second portion 6.

The present invention enhances the aesthetic of the surrounding environment as the present invention further comprises a plurality of legs 22, shown in FIG. 1, FIG. 2, FIG. 4, FIG. 5, and FIG. 8. The plurality of legs 22 stabilizes the second portion 6 onto the ground and camouflages the present invention with surrounding furniture. In order to stabilize the second portion 6, the plurality of legs 22 is positioned external to the second portion 6 and positioned offset from the second opening 7. The present invention is camouflaged with the surrounding furniture as the plurality of legs 22 is distributed about the base 31 of the second portion 6.

Figure 1:
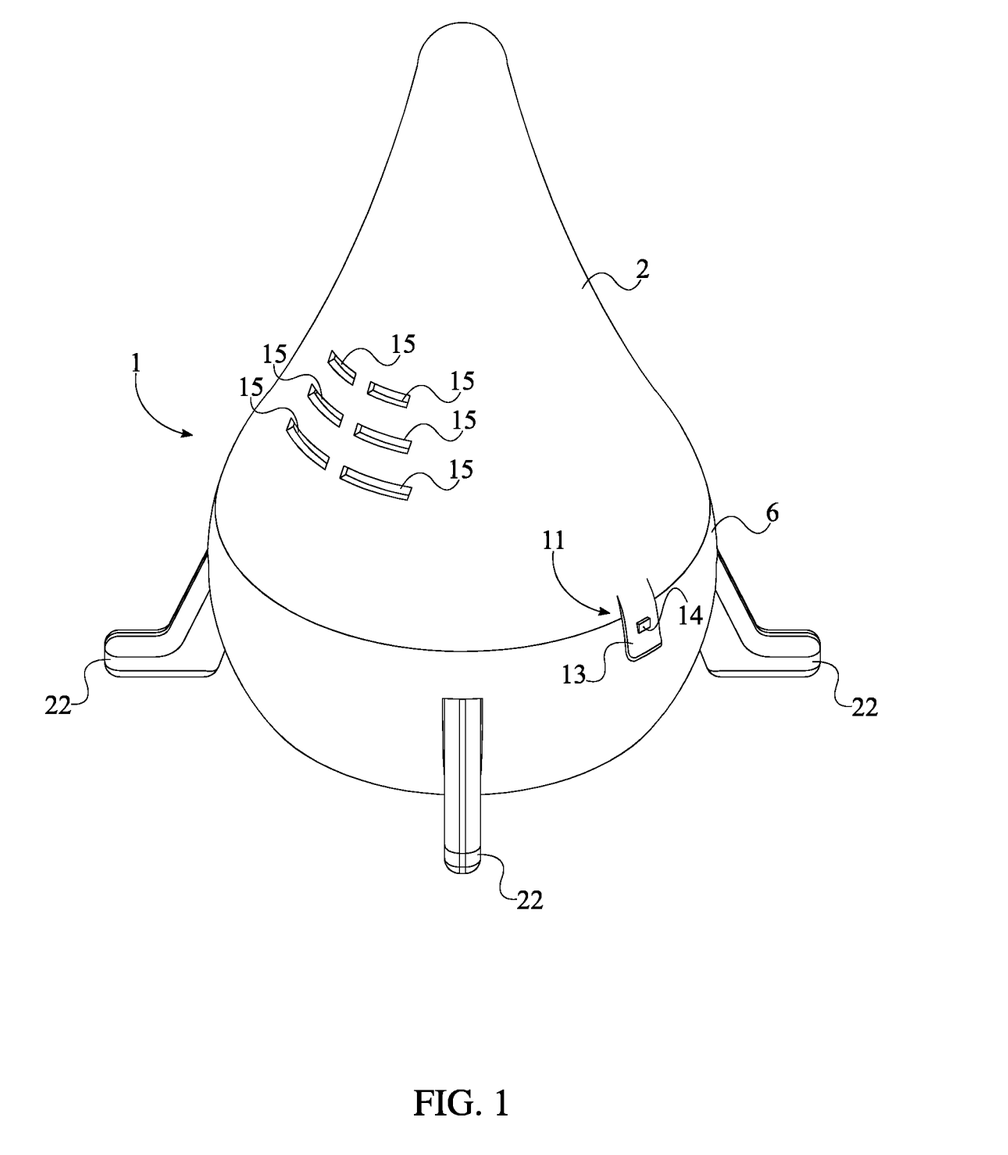
FIG. 1 is a top perspective view of the present invention.
Figure 2:
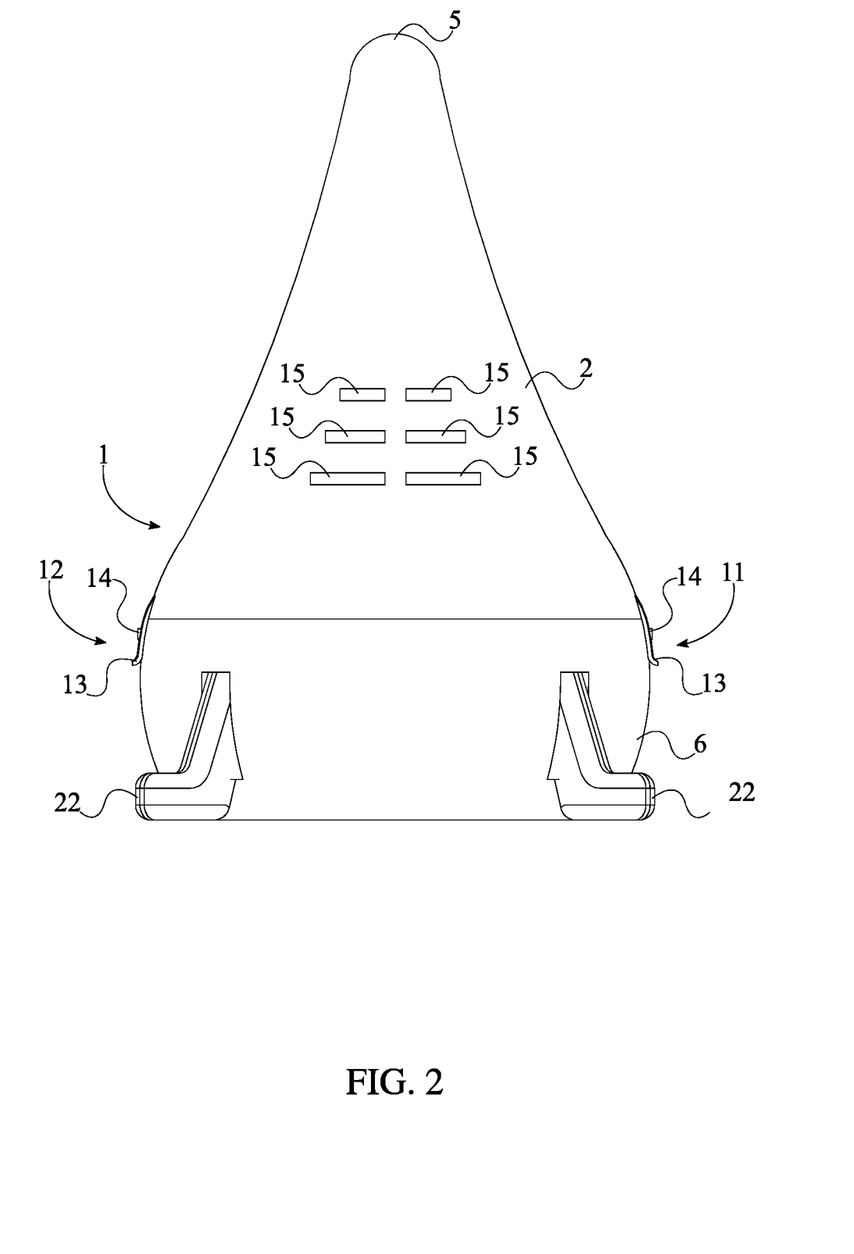
FIG. 2 is a front side view of the present invention.
Figure 3:
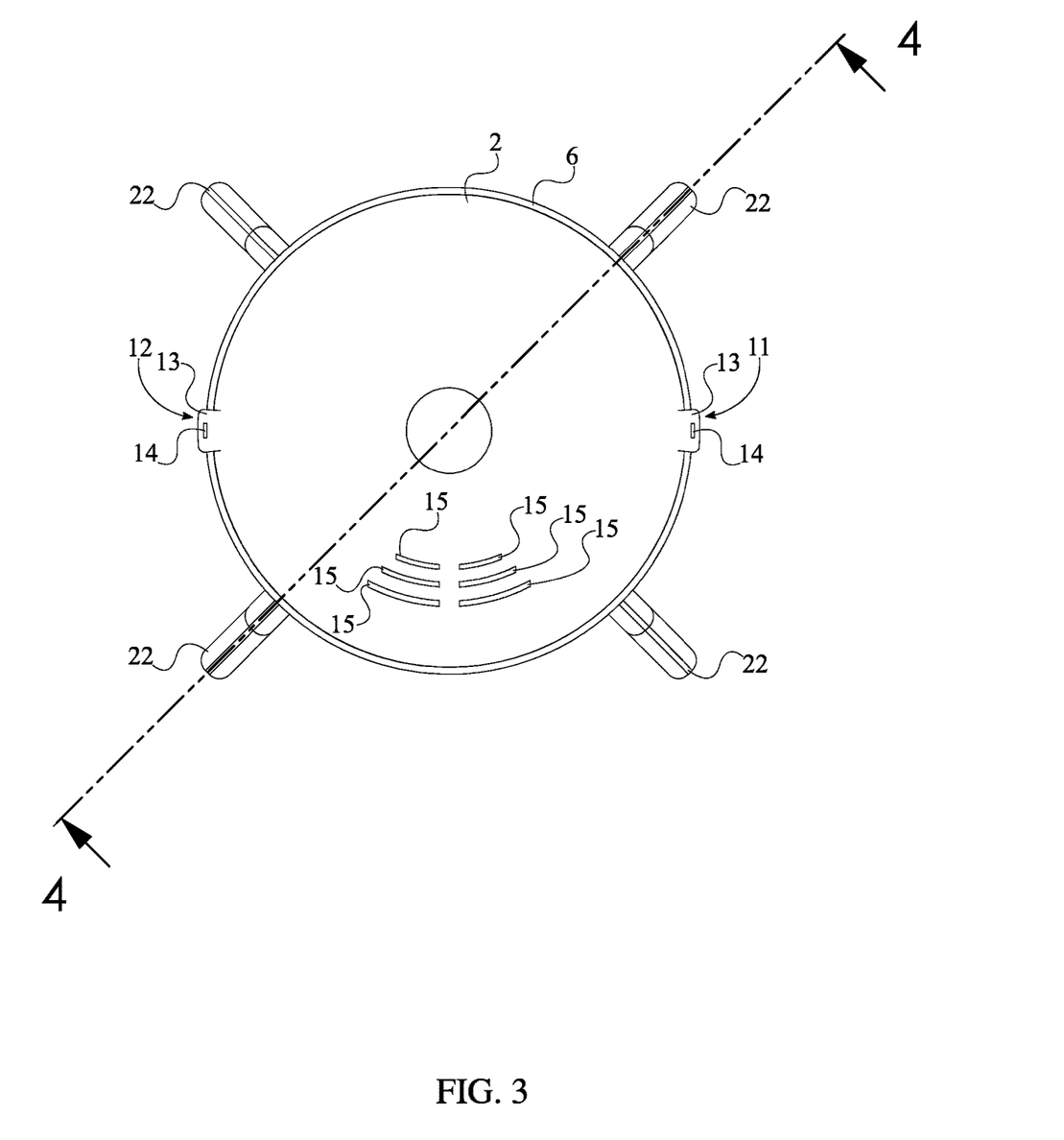
FIG. 3 is a top side view of the present invention.

In order to effectively contain a pet within the elongated enclosure 1 while allowing a user to easily separate the first portion 2 from the second portion 6, the plurality of fasteners 10 comprises a first fastener 11 and a second fastener 12, seen in FIG. 1, FIG. 2, and FIG. 3. The first fastener 11 and the second fastener 12 are laterally positioned to the elongated enclosure 1. More specifically, the first fastener 11 and the second fastener 12 are positioned opposite each other about the elongated enclosure 1. In the preferred embodiment of the present invention, the first fastener 11 and the second fastener 12 each comprises a female interlocking member 13. Moreover, the first fastener 11 and the second fastener 12 each comprise a male interlocking member 14. The female interlocking member 13 of the first fastener 11 and the female interlocking member 13 of the second fastener 12 are diametrically opposed to each other about the first rim 4. Similarly, the male interlocking member 14 of the first fastener 11 and the male interlocking member 14 of the second fastener 12 are diametrically opposed to each other about the second rim 8. This arrangement allows the first portion 2 to be easily secured to the second portion 6.

Figure 9:
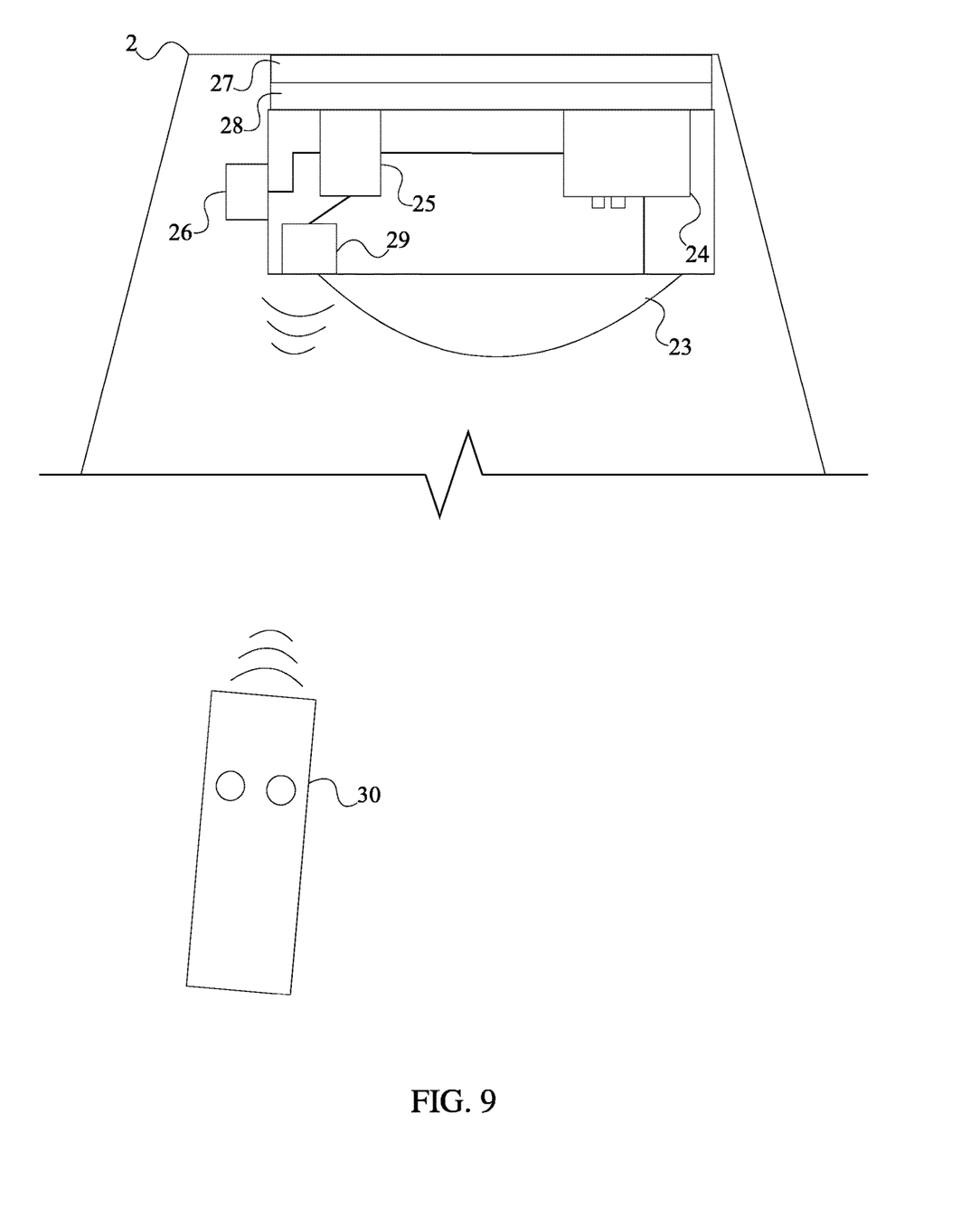
FIG. 9 is a schematic view of the electrical connections between the portable power source, the power switch, the light source, and the activation switch, and the wireless communication between the wireless receiver and the remote controller of the present invention.

The preferred embodiment of the present invention further comprises a light source 23, a portable power source 24, a power switch 25, and an activation switch 26, illustrated in FIG. 9. The light source 23, as seen in FIG. 4, FIG. 6, and FIG. 7, illuminates the interior environment of the elongated enclosure 1. The portable power source 24 provides the power to the light source 23. The power switch 25 connects and disconnects the connection between the light source 23 and the portable power source 24. The activation switch 26 allows a user to manually turn on and turn off the light source 23. The light source 23 is detachably attached within the first portion 2 and is positioned offset the first opening 3. This arrangement maximizes the illumination within the interior environment without blinding the pet within the elongated enclosure 1. The power switch 25 and the portable power source 24 is preferably mounted within the first portion 2. This requires a user to turn on and turn off the light source 23 only with the separation of the first portion 2 from the second portion 6, furthering the temporary housing feature of the present invention. In order for the user to turn on and turn off the light source 23, the portable power source 24 is electrically connected to the power switch 25 and the light source 23, and the activation switch 26 is electronically connected to the power switch 25.

As shown in FIG. 4. and FIG. 9, the present invention further comprises a first magnet 27 and a second magnet 28 so that the light source 23 may be removable from within the first portion 2. The first magnet 27 connects the second magnet 28 to the first portion 2. The second magnet 28 connects the light source 23 to the first magnet 27. In order for the light source 23 to illuminate the interior environment, the first magnet 27 is mounted within the first portion 2, and the second magnet 28 is externally mounted onto the light source 23. The first magnet 27 and the second magnet 28 are magnetically coupled to each other, thereby allowing the light source 23 to be mountable within and removable from the first portion 2.

An alternate embodiment of the present invention comprises a wireless receiver 29 and a remote controller 30, seen in FIG. 9. The wireless receiver 29 allows the remote controller 30 to communicate with the light source 23. The remote controller 30 allows the user to turn on and turn off the light source 23 without manually engaging the activation switch 26. More specifically, the wireless receiver 29 is electronically connected to the power switch 25 and is communicably coupled to the remote controller 30.

Although the invention has been explained in relation to its preferred embodiment, it is to be understood that many other possible modifications and variations can be made without departing from the spirit and scope of the invention as hereinafter claimed.

What is claimed is:
1. A temporary pet kennel comprising:
an elongated enclosure;
a cushion;
a plurality of fasteners;
at least one ventilation hole;
a supporting plate;
a stand;
a pair of holes;
the elongated enclosure comprising a first portion and a second portion;
a first opening being delineated by a first rim of the first portion;

a second opening being delineated by a second rim of the second portion;
the first opening being adjacently positioned to the second opening;
the first rim and the second rim being coaxially aligned to each other;
the first portion being connected to the second portion via the plurality of fasteners;
the plurality of fasteners being oppositely positioned to each other about the second portion and the first portion;
the cushion traversing into the second opening;
the second rim being perimetrically positioned around the cushion;
the at least one ventilation hole traversing into the first portion;
the supporting plate and the stand being positioned within the second portion;
the stand being pressed against a base of the second portion;
the supporting plate being pressed against the stand;
the supporting plate being oppositely positioned to the base of the second portion;
the cushion being pressed against the supporting plate;
the cushion being oppositely positioned to the stand;
the pair of holes traversing through the supporting plate;
the pair of holes being oriented normal to the supporting plate;
the stand comprising a plurality of elongated dividers;
the plurality of elongated dividers being radially distributed around a central axis of the supporting plate, such that a plurality of compartments are delineated by the plurality of elongated dividers and the base of the second portion;
a strap;
the strap being connected onto the supporting plate;
the strap being oppositely positioned to the stand; and
a loop of the strap being inserted into the pair of holes.

2. The temporary pet kennel as claimed in claim 1 comprising:
a plurality of legs;
the plurality of legs being externally positioned to the second portion;
the plurality of legs being oppositely positioned to the second opening;
the plurality of legs being detachably attached to the second portion; and
the plurality of legs being positioned on the base of the second portion.

3. The temporary pet kennel as claimed in claim 1 comprising:
the plurality of fasteners comprising a first fastener and a second fastener;
the first fastener and the second fastener being laterally positioned to the elongated body; and
the first fastener and the second fastener being oppositely positioned to each other about the elongated body.

4. The temporary pet kennel as claimed in claim 3 comprising:
the first fastener and the second fastener each comprising a female interlocking member; and
the female interlocking member of the first fastener and the female interlocking member of the second fastener being annularly opposed to each other about the first rim.

5. The temporary pet kennel as claimed in claim 3 comprising:
the first fastener and the second fastener each comprising a male interlocking member; and
the male interlocking member of the first fastener and the male interlocking member of the second fastener being annularly opposed to each other about the second rim.

6. The temporary pet kennel as claimed in claim 1 comprising:
a light source;
a portable power source;
a power switch;
an activation switch;
the light source being detachably attached within the first portion;
the light source being oppositely positioned to the first opening;
the power switch and the portable power source being mounted within the first portion;
the portable power source being electrically connected to the power switch and the light source; and
the activation switch being electronically connected to the power switch.

7. The temporary pet kennel as claimed in claim 6 comprising:
a first magnet;
a second magnet;
the first magnet being mounted within the first portion;
the second magnet being externally mounted onto the light source; and
the first magnet and the second magnet being magnetically coupled to each other.

8. The temporary pet kennel as claimed in claim 6 comprising:
a wireless receiver;
a remote controller;
the wireless receiver being electronically connected to the power switch; and
the wireless receiver being communicably coupled to the remote controller.

9. The temporary pet kennel as claimed in claim 1, wherein the first portion tapers from the first rim to an apex of the first portion.

* * * * *